United States Patent [19]

Kato et al.

[11] Patent Number: 5,179,162

[45] Date of Patent: Jan. 12, 1993

[54] N-SUBSTITUTED MALEIMIDE POLYMER COMPOSITION

[75] Inventors: Kenji Kato; Yasumi Koinuma; Kazunori Doiuchi; Seigo Kinoshita; Yukinori Haruta, all of Oita, Japan

[73] Assignee: Nippon Oil & Fats Co., Ltd., Tokyo, Japan

[21] Appl. No.: 713,630

[22] Filed: Jun. 10, 1991

Related U.S. Application Data

[63] Continuation of Ser. No. 457,287, Dec. 27, 1989, abandoned.

[30] Foreign Application Priority Data

Dec. 28, 1988 [JP] Japan .................. 63-328961

[51] Int. Cl.$^5$ .................. C08L 59/02; C08L 39/04
[52] U.S. Cl. .................. 525/154; 525/132; 525/150; 525/148; 525/175; 525/181; 525/189
[58] Field of Search .................. 525/146, 148, 154; 526/262

[56] References Cited

U.S. PATENT DOCUMENTS

| | | | |
|---|---|---|---|
| 3,219,727 | 11/1965 | Kray | 525/154 |
| 3,327,023 | 6/1967 | Schoenholzer | 525/154 |
| 4,578,422 | 3/1986 | Sakurai | 524/593 |
| 4,963,618 | 10/1990 | Sasaki | 525/67 |

FOREIGN PATENT DOCUMENTS

| | | | |
|---|---|---|---|
| 250010 | 11/1986 | Japan | 526/262 |
| 250048 | 11/1986 | Japan | 525/148 |
| 007757 | 1/1987 | Japan | 525/148 |
| 34943 | 2/1987 | Japan . | |
| 1515969 | 6/1978 | United Kingdom . | |

*Primary Examiner*—David J. Buttner
*Attorney, Agent, or Firm*—Majestic, Parsons, Siebert & Hsue

[57] ABSTRACT

As N-substituted maleimide polymer composition contains 20 to 90 parts by weight of an N-substituted maleimide polymer and 80 to 10 parts by weight of a thermoplastic resin selected from a polycarbonate polymer, a polysulfone polymer, a polyphenylene ether polymer, a polyarylene sulfide polymer, and a modified polymer of the polymer or polymers, a polyoxymethylene polymer, a polyester polymer, a polyamide polymer and mixtures thereof.

2 Claims, No Drawings

N-SUBSTITUTED MALEIMIDE POLYMER COMPOSITION

This is a continuation of Application Ser. No. 457,287, filed Dec. 27, 1989 now abandoned.

BACKGROUND OF THE INVENTION

The present invention relates to an N-substituted maleimide polymer composition which has excellent thermal resistance, resistance against impact strength, mechanical strength and moldability.

It has hitherto been known that a resin having improved thermal resistance is prepared by copolymerizing an N-substituted maleimide with other vinyl monomers. For example, Japanese Patent Publication No. 9753/1968 discloses that a copolymer of phenyl maleimide and methyl methacrylate is useful for a molding material, and Japanese Patent Publication No. 12433/1969 discloses that a copolymer of vinyl chloride and a maleimide compound is useful for a molding material. "KOBUNSHI KAGAKU", Vol. 28., Page 330 (1971) and other publications disclose processes for preparing homopolymers of N-substituted maleimide and that the thus prepared N-maleimide polymers have resistance to extremely high temperature.

However, the thermal resistance of the known copolymer of the N-substituted maleimide and the vinyl monomer is still unsatisfactory. Although the known N-substituted maleimide copolymer has resistance to high temperature, it is extremely brittle and only has low mechanical strength, such as resistance against impact strength or tensile strength, so that it cannot be used as a molding material.

SUMMARY OF THE INVENTION

A principal object of this invention is to provide an N-substituted maleimide polymer composition which has well-balanced properties such as thermal resistance, resistance against impact strength and mechanical strength and thus can be used as a molding material.

The above and other objects of the invention will become apparent from the following description.

According to the present invention, there is provided an N-substituted maleimide polymer composition comprising: 20 to 90 parts by weight of an N-substituted maleimide polymer; 80 to 10 parts by weight of a thermoplastic resin selected from the group consisting of a polycarbonate polymer, a polysulfone polymer, a polyphenylene ether polymer, a polyarylene sulfide polymer, and a modified polymer of the polymer or polymers, a polyoxymethylene polymer, a polyester polymer, a polyamide polymer and mixtures thereof.

PREFERRED EMBODIMENTS OF THE INVENTION

The present invention will now be described in detail.

The characteristic feature of the N-substituted maleimide polymer composition, according to the invention, resides in that the N-substituted maleimide polymer composition contains a specifically defined thermoplastic resin as essential components.

The N-substituted maleimide polymer used in this invention may be a polymer of one or more N-substituted maleimide compounds represented by the fomula (I):

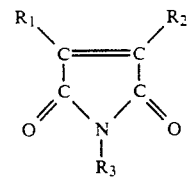

In the formula (I), $R_1$ and $R_2$ each stand for a hydrogen atom, a halogen atom or a methyl group; and $R_3$ stands for a straight chain or branched chain alkyl group having 1 to 18 carbon atoms, a cycloalkyl group having 3 to 12 carbon atoms, an alkyl-substituted cycloalkyl group, an aryl group having 6 to 18 carbon atoms or an aralkyl group having 7 to 18 carbon atoms. It is not preferred that $R_3$ has carbon atoms more than the range as defined above, since preparation of the N-substituted polymer becomes difficult. Specific examples of preferred N-substituted maleimide compound, which may be used in this invention, include N-methyl maleimide, N-ethyl maleimide, N-n-propyl maleimide, N-i-propyl maleimide, N-n-butyl maleimide, N-i-butyl maleimide, N-sec-butyl maleimide, N-t-butyl maleimide, N-n-hexyl maleimide, N-cyclohexyl maleimide, N-2-methylcyclohexyl maleimide, N-2-ethylhexyl maleimide, N-decyl maleimide, N-dodecyl maleimide, N-cyclododecyl maleimide, N-octadecyl maleimide, N-phenyl maleimide, N-2-methylphenyl maleimide, N-p-i-propylphenyl maleimide, N-2,4-dimethylphenyl maleimide, N-benzyl maleimide, N-methyl-α-methyl maleimide, N-phenyl-α-methyl maleimide, N-phenyl-α-chloro maleimide, N-phenyl-α,β-dimethyl maleimide. These N-substituted maleimide compounds may be polymerized singly or in combination.

In the preparation of the N-substituted maleimide polymer by polymerizing one or more of the aforementioned N-substituted maleimide compounds, one or a mixture of two or more of the N-substituted maleimide compounds is polymerized in the presence of a polymerization initiator by a known process, such as suspension polymerization, solution polymerization, emulsion polymerization or bulk polymerization. More sepcifically, it is preferred to effect polymerization at a temperature of, for example, from 0° to 120° C., particularly preferably from 40° to 100° C., for 3 to 12 hours. Known organic peroxides, azo compounds and the like may be used as the polymerization initiators. It is preferred that the polymerization initiator be used in an amount of 0.01 to 5 wt %, based on the weight of the N-substituted maleimide compound. It is preferred that the resultant N-substituted maleimide has a molecular weight of a weight average molecular weight of from 2,000 to 500,000. The molecular weight of less than 2,000 is too small to obtain satisfactory thermal resistance. On the contrary, if the molecular weight is more than 500,000, the compatibility with other thermoplastic resins becomes poor and the moldability is deteriorated. The weight average molecular weight can be controlled by adding a polymerization modifier, such as mercaptans, at the polymerization step. The weight average molecular weight may be determined by the limiting viscosity method or by the gel permeation chromatography (hereinafter briefly referred to as "GPC").

The thermoplastic resins added to the N-substituted maleimide polymer, according to this invention, include a polycarbonate polymer, a polysulfone polymer, a polyphenylene ether polymer, a polyarylene sulfide polymer, and a modified polymer of such polymer or polymers, a polyoxymethylene polymer, a polyester polymer, a polyamide polymer and mixtures thereof. Preferably, each of these polymers has a molecular weight of not more than 10,000.

The polycarbonate polymer, which may be used in this invention, preferably has a structural unit represented by the following formula (II) or (III):

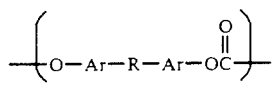 (II)

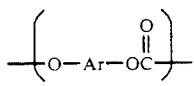 (III)

In the formulae (II) and (III), Ar stands for a phenylene group or a phenylene group substituted by an alkyl group, an alkoxy group or a halogen atom; and R stands for an alkylene group, a cycloalkylene group, a sulfur atom, an oxygen atom, a sulfoxide group or a sulfone group. A preferable example of the polycarbonate polymers having the structural unit as represented by the formula (II) or (III) is poly-4,4'-dioxydiphenyl-2,2'-propane carbonate.

The polysulfone polymer, which may be used in this invention, preferably has a structural unit represented by the following formula (IV) or (V):

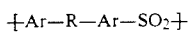 (IV)

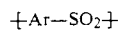 (V)

In the formulae (IV) and (V), Ar stands for a phenyl group; and R stands for an oxygen atom, a sulfur atom or an aromatic diol residue. Specific examples of the preferred polysulfone polymers having the structural unit represented by the formula (IV) or (V) are poly(ethersulfone) and poly(4,4'-bisphenolethersulfone).

The polyphenylene ether polymer, which may be used in this invention preferably has a structural unit represented by the following formula (VI):

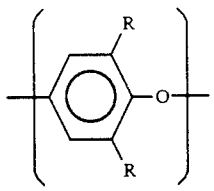 (VI)

In the formula (VI), R stands for an alkyl group having 1 to 4 carbon atoms. A preferable example of the polyphenylene ether polymer having the structural unit as represented by the formula (VI) is poly(2,6-dimethyl-1,4-phenylene)ether.

The polyarylene sulfide polymer, which may be used in this invention, preferably has a structural unit represented by the following formula (VII):

 (VII)

In the formula (VII), Ar stands for a phenylene group or an alkyl-substituted phenylene group. A preferred example of the polyarylene sulfide polymer having the structural unit as represented by the formula (VII) is polyphenylene sulfide.

The modified polymers of the polycarbonate polymer, polysulfone polymer, polyphenylene ether polymer or polyarylene sulfide polymer, which may be used in this invention, may be composed of 50 to 90 wt % of the aforementioned polymer or polymers and 50 to 10 wt % of a styrene polymer selected from the group consisting of, for example, polystyrene, a butadiene-styrene block copolymer, a high impact strength rubber-modified styrene polymer, an acrylonitrile-butadiene-styrene copolymer, a methacrylic acid ester-butadiene-styrene copolymer and mixtures thereof.

Preferable examples of the polyoxymethylene polymer, which may be used in this invention, are a homopolymer and a copolymer of formaldehyde, a homopolymer and a copolymer of trioxane, and mixtures thereof.

The polyester polymer, which may be used in this invention, preferably has a structural unit represented by the following formula (VIII):

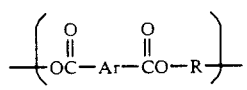 (VIII)

In the formula (VIII), Ar stands for a phenylene group or an alkyl-substituted phenylene group; and R stands for an alkylene group or a cycloalkylene group. Preferable examples of the polyester polymers having the structural unit represented by the formula (VIII) are polyethylene terephthalate and polybutylene terephthalate.

The polyamide polymer, which may be used in this invention, preferably has a structural unit repesented by the following formula (IX) or (X):

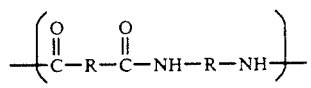 (IX)

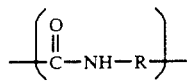 (X)

In the formulae (IX) and (X), R stands for an alkylene group. Preferable examples of the polyamide polymer having the structural unit represented by the formula (IX) or (X) are polycaprolactam and polyhexamethyleneadipamide.

Any one or more of commercially available thermoplastic resin may be used as the thermoplastic resins added to the N-substituted maleimide polymer in the present invention.

In the present invention, 20 to 90 parts by weight of the N-substituted maleimide polymer is mixed with 80 to 10 parts by weight of the thermoplastic resin. If the content of the N-substituted maleimide polymer is more than 90 parts by weight, namely the content of the thermoplastic resin is less than 10 parts by weight, the resistance against impact strength or mechanical strength of the resultant composition is seriously lowered. On the contrary, if the content of the N-substituted maleimide polymer is less than 20 parts by weight, namely the content of the thermoplastic resin is more than 80 parts by weight, the thermal resistance becomes poor to unsatisfactory level.

To the N-substituted maleimide polymer composition, according to this invention, there may be added a reinforcing material, such as silica, carbon black, clay, glass fibers, organic fibers or calcium carbonate, a filler, an antioxidant, an ultraviolet ray absorbent, a stabilizer, a pigment, a lubricant, a flame retardant or other additives.

In preparation of the N-substituted maleimide polymer composition of the invention, it is preferred that respective components blended in a desired ratio be mixed in the molten state by using a variety of mixers which are used for mixing ordinary mixtures of polymers, such as uniaxial or multiaxial screw type extruders, mixing rollers, banbury mixers or kneaders.

The N-substituted maleimide polymer composition of the invention may be molded by any of the known molding processes, such as extrusion molding, injection molding or blow molding, to prepare a finished product of various forms including a sheet, a film and a foamed product.

The N-substituted maleimide polymer composition of this invention contains one or more of the specifically defined thermoplastic resins to improve the brittleness of the N-substituted maleimide polymer, and thus can be used as a resinous molding material which is well-balanced in thermal resistance, resistance against impact strength and other mechanical strength.

EXAMPLES OF THE INVENTION

The present invention will be described more in detail with reference to specific Examples thereof and Reference Examples. However, it should be noted here that the present invention is not limited to the following Examples. In the following Examples and Reference Examples, "part" stands for "part by weight".

REFERENCE EXAMPLE 1

Preparation of N-cyclohexyl Maleimide Polymer

In a four-neck flask provided with a stirrer, a thermometer, a nitrogen gas introduction tube and a Dimroth condenser, 1 part of a partially hydrolysed polyvinyl alcohol and 1 part of sodium lauryl sulfonate were added to 400 parts of deionized water to be dissolved in the deionized water. Then, a solution containing 100 parts of N-cyclohexyl maleimide dissolved in 100 parts of methyl ethyl ketone and 0.3 part of lauryl mercaptan were charged into the flask and stirred to obtain a suspension. A solution containing 1.0 part of dibenzoyl peroxide dissolved in 5 parts of methyl ethyl ketone was added, as a polymerization initiator, to the suspension and the temperature of the system was raised to 80° C. to initiate polymerization. After stirring for 9 hours, the content in the flask was cooled to room temperature, and the suspension was filtered and washed with water, followed by drying in vacuum, to obtain an N-cyclohexyl maleimide polymer. The yield was 84 parts, and the weight average molecular weight of the polymer was 38,000. The thus obtained polymer is denoted by "Polymer A".

The Polymer A was pelletized using a double axial 40 mm extruder, and then the pellets were molded by a press to prepare test specimens. The tensile strength at 70° C. of the test specimen was 20 kg/cm$^2$, and the Izod impact strength was 0.3 kg.cm/cm.

REFERENCE EXAMPLE 2

Preparation of N-phenyl Maleimide Polymer

Following the procedures as in Reference Example 1, except that N-phenyl maleimide was used in place of N-cyclohexyl maleimide, an N-phenyl maleimide polymer (hereinafter referred to as "Polymer B") having a weight average molecular weight of 100,000 was prepared, and test specimens were prepared therefrom similarly as in Reference Example 1. The tensile strength at 70° C. of the test specimen was 8 kg/cm$^2$, and the Izod impact strength was 0.1 kg.cm/cm.

REFERENCE EXAMPLE 3

Preparation of N-t-butyl Maleimide Polymer

Following the procedures as in Reference Example 1, except that N-t-butyl maleimide was used in place of N-cyclohexyl maleimide, an N-t-butyl maleimide polymer (hereinafter referred to as "Polymer C") having a weight average molecular weight of 80,000 was prepared, and test specimens were prepared therefrom similarly as in Reference Example 1. The tensile strength at 70° C. of the test specimen was 28 kg/cm$^2$, and the Izod impact strength was 0.4 kg.cm/cm.

EXAMPLES 1 TO 7

After 100 parts of the Polymer A as prepared by Reference Example 1 was mixed with 100 parts of each of the thermoplastic resins as set forth in Table 1, the mixture was pelletized using a double axial extruder and each test specimen was then prepared from the pellets by molding the same by a press. The tensile strength at 70° C. and the Izod impact strength of each test specimen were measured. The results are shown in Table 1 while calculating the measured values into the ratios to the measured values in Reference Example 1.

EXAMPLE 8

50 parts of the Polymer B as prepared by Reference Example 2 were mixed with 150 parts of a polycarbonate resin (Trade Name: "PANLITE L-1225"; produced by Teijin Kasei Co., Ltd.), and test specimens were prepared. Tests were conducted similarly to Examples 1 to 7. The results are shown in Table 1 while calculating the measured values into the ratios to the measured values in Reference Example 2.

EXAMPLE 9

130 parts of the Polymer C as prepared by Reference Example 3 were mixed with 70 parts of a polyester resin (Trade Name: "PBT 1041"; produced by Toray Industries Inc.), and test specimens were prepared. Tests were conducted similarly to Examples 1 to 7. The results are shown in Table 1 while calculating the measured values into the ratios to the measured values in Reference Example 3.

TABLE 1

|  | Mixed Thermoplastic Resin (Trade Name) | Ratio in Tensile Strength to Maleimide Homopolymer | Ratio in Resistance against Impact Strength to Maleimide Homopolymer |
|---|---|---|---|
| Example 1 | Polyoxymethylene ("DELRIN"; produced by E. I. du Pont de Nemours & Co. Inc.) | 2.1 | 2.2 |
| Example 2 | Polycarbonate ("PANLITE L-1225"; produced by Teijin Kasei Co., Ltd.) | 5.1 | 9.9 |
| Example 3 | Polyester ("PBT 1041"; produced by Toray Industries Inc.) | 2.8 | 5.5 |
| Example 4 | Polyamide ("AMYLANE"; produced by Toray Industries Inc.) | 3.3 | 5.8 |
| Example 5 | Polysulfone (POLYETHERSULFONE 200P"; produced by ICI) | 4.6 | 4.7 |
| Example 6 | polyphenylene Ether ("XYRON 400H"; produced by Asahi Chemical Industry Co., Ltd.) | 3.4 | 8.5 |
| Example 7 | Polyphenylene sulfide ("LIGHTON R-6"; produced by Philip Petroleum Co.) | 3.2 | 5.4 |
| Example 8 | Polycarbonate ("PANLITE L-1225"; produced by Teijin Kasei Co., Ltd.) | 7.0 | 11.6 |
| Example 9 | Polyester ("PBT 1041"; produced by Toray Industries Inc.) | 1.9 | 3.1 |

As will be seen from the results set forth in Table 1, the N-substituted maleimide polymer compositions according to the invention are considerably improved in tensile strength under heating condition over that of the homopolymer of an N-substituted maleimide, which reveals that the thermal resistance and mechanical strength of the polymer compositions of this invention are superior over those of the homopolymer of an N-substituted maleimide.

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claims is:

1. An N-cyclohexyl maleimide polymer composition comprising:
   20 to 90 parts by weight of an N-cyclohexyl maleimide polymer having a weight average molecular weight of from 2,000 to 500,000; and
   80 to 10 parts by weight of a polyoxymethylene polymer.

2. The composition according to claim 1, wherein said polyoxymethylene polymer is selected from the group consisting of a homopolymer and a copolymer of formaldehyde, a homopolymer and a copolymer of trioxane, and mixtures thereof.

* * * * *